US009736717B2

(12) United States Patent
Zhou et al.

(10) Patent No.: US 9,736,717 B2
(45) Date of Patent: Aug. 15, 2017

(54) ACCESS METHOD, BASE STATION, ACCESS POINT AND USER EQUIPMENT

(71) Applicant: Huawei Technologies Co., Ltd., Shenzhen (CN)

(72) Inventors: Weihua Zhou, Shenzhen (CN); Xin Xiong, Shenzhen (CN); Yinghui Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 14/541,903

(22) Filed: Nov. 14, 2014

(65) Prior Publication Data
US 2015/0071063 A1 Mar. 12, 2015

Related U.S. Application Data

(63) Continuation of application No. PCT/CN2013/073748, filed on Apr. 3, 2013.

(30) Foreign Application Priority Data

May 16, 2012 (CN) .......................... 2012 1 0151280

(51) Int. Cl.
H04W 28/02 (2009.01)
H04W 28/08 (2009.01)
(Continued)

(52) U.S. Cl.
CPC ....... *H04W 28/0205* (2013.01); *H04W 28/08* (2013.01); *H04W 76/00* (2013.01);
(Continued)

(58) Field of Classification Search
None
See application file for complete search history.

(56) References Cited

U.S. PATENT DOCUMENTS

2011/0269465 A1 11/2011 Xu et al.

FOREIGN PATENT DOCUMENTS

CN 101170796 A 4/2008
CN 101232433 A 7/2008
(Continued)

OTHER PUBLICATIONS

"Consideration on 'CorrelationID' for LIPA Bearers in H(e)NB" 3GPP TSG RAN WG3 #70bis meeting, Dublin, Ireland, 3$^{rd}$ Generation Partnership Project, Valbonne, France (Jan. 17-21, 2011).

*Primary Examiner* — Candal Elpenord
*Assistant Examiner* — Adam Duda
(74) *Attorney, Agent, or Firm* — Leydig, Voit & Mayer, Ltd.

(57) ABSTRACT

Embodiments of the present invention provide an access method, a base station, an access point and a user equipment. The access method includes: a base station sends a first message to an access point through a first communication interface, for requesting the access point to establish a second bearer with a user equipment UE, the second bearer being based on a second communication interface, wherein the first message carries an identifier of the UE and an identifier of an E-RAB; and the base station establishes a first bearer with the access point, the first bearer being based on the first communication interface, wherein the first bearer and the second bearer correspond to the E-RAB.

17 Claims, 8 Drawing Sheets

(51) Int. Cl.
*H04W 76/00* (2009.01)
*H04W 92/20* (2009.01)
*H04W 88/02* (2009.01)
*H04W 88/08* (2009.01)

(52) U.S. Cl.
CPC ............ *H04W 88/02* (2013.01); *H04W 88/08* (2013.01); *H04W 92/20* (2013.01)

(56) References Cited

FOREIGN PATENT DOCUMENTS

| | | | |
|---|---|---|---|
| EP | 2383969 A1 | 11/2011 | |
| WO | WO 2008047126 A1 | 4/2008 | |
| WO | WO 2013123643 A1 | 8/2013 | |

ACCESS METHOD, BASE STATION, ACCESS POINT AND USER EQUIPMENT

CROSS-REFERENCE TO RELATED APPLICATIONS

This application is a continuation of International Patent Application No. PCT/CN2013/073748, filed on Apr. 3, 2013 which claims priority to Chinese Patent Application No. 201210151280.7, filed on May 16, 2012, both of which are hereby incorporated by reference in their entireties.

FIELD OF THE INVENTION

Embodiments of the present invention relate to the field of communications technologies, and more particularly to an access method, a base station, an access point and a user equipment.

BACKGROUND OF THE INVENTION

With the development of mobile communication technologies, a currently operated communication network has been unable to meet the demand for large traffic. Since an operational network is maintained under a high load condition for a long term, and the expanded capacity will soon be consumed by increased services, a low-cost and large-capacity solution is in urgent need to solve the increasingly acute problem.

An LTE-Hi (High Frequency Indoor) technology based on long term evolution (LTE, Long Term Evolution) is suitable for fixed and low-speed moving indoor and hotspot scenarios. The technology mainly has such characteristics as being for hotspot/indoor low-speed moving scenarios, high-speed data services, utilization of frequency spectrums with high frequency, controllability and manageability for an operator, low cost, and the like.

In an LTE-Hi access method, a plurality of LTE-Hi are connected to a core network through an LTE-Hi gateway (e.g., LTE-Hi GW), namely, the LTE-Hi is accessed to the core network independent to an evolutional base station (eNB or e-NodeB, evolutional Node B), and thus, the LTE-Hi may be deployed in an area which is covered by the eNB for capacity enhancement or be deployed in an area which is not covered by the eNB for coverage extension. However, since there is no interface between the eNB and the LTE-Hi, it is difficult to realize load balance between the eNB and the LTE-Hi.

SUMMARY OF THE INVENTION

Embodiments of the present invention provide an access method, a base station, an access point and user equipment, which may realize load balance between an eNB and an LTE-Hi.

In an aspect, there is provided an access method, including: sending, by a base station, a first message to an access point through a first communication interface, for requesting the access point to establish a second bearer with a user equipment UE, the second bearer being based on a second communication interface, wherein the first message carries an identifier of the UE and an identifier of an E-RAB (E-UTRAN Radio Access Bearer); and establishing, by the base station, a first bearer with the access point, the first bearer being based on the first communication interface, wherein the first bearer and the second bearer correspond to the E-RAB.

In another aspect, there is provided an access method, including: receiving, by an access point, a first message from a base station through a first communication interface, wherein the first message carries an identifier of a user equipment UE and an identifier of an E-RAB; sending, by the access point, a sixth message to the UE through a second communication interface according to the first message, for establishing a second bearer with the UE, the second bearer being based on the second communication interface, wherein the sixth message carries an identifier of the second bearer allocated by the access point; and establishing, by the access point, a first bearer with the base station, the first bearer being based on the first communication interface, wherein the first bearer and the second bearer correspond to the identifier of the E-RAB.

In another aspect, there is provided an access method, including: receiving, by a user equipment UE, a sixth message from an access point through a second communication interface, wherein the sixth message carries an identifier of a second bearer allocated by the access point; and establishing, by the UE, the second bearer with the access point according to the sixth message, the second bearer being based on the second communication interface.

In another aspect, there is provided a base station, including: a sending module, configured to send a first message to an access point through a first communication interface, for requesting the access point to establish a second bearer with a user equipment UE, the second bearer being based on a second communication interface, wherein the first message carries an identifier of the UE and an identifier of an E-RAB; and a establishing module, configured to establish a first bearer with the access point, the first bearer being based on the first communication interface, wherein the first bearer and the second bearer correspond to the E-RAB.

In another aspect, there is provided an access point, including: a receiving module, configured to receive a first message from a base station through a first communication interface, wherein the first message carries an identifier of a user equipment UE and an identifier of an E-RAB; a sending module, configured to send a sixth message to the UE through a second communication interface according to the first message, for establishing a second bearer with the UE, the second bearer being based on the second communication interface, wherein the sixth message carries an identifier of the second bearer allocated by the access point; and a establishing module, configured to establish a first bearer with the base station, the first bearer being based on the first communication interface, wherein the first bearer and the second bearer correspond to the identifier of the E-RAB.

In another aspect, there is provided a user equipment, including: a receiving module, configured to receive a sixth message from an access point through a second communication interface, wherein the sixth message carries an identifier of a second bearer allocated by the access point; and a establishing module, configured to establish a second bearer with the access point according to the sixth message, the second bearer being based on the second communication interface.

In the technical solutions, the first bearer which is based on the first communication interface is established between the access point and the base station, and the second bearer which is based on the second communication interface is established between the access point and the UE, in order to transmit data through the first bearer and the second bearer under the control of the base station, thereby realizing load balance between the base station and the access point.

BRIEF DESCRIPTION OF THE DRAWINGS

In order to illustrate the technical solutions in the embodiments of the present invention more clearly, accompanying drawings needed for describing the embodiments are introduced briefly in the following. Obviously, the accompanying drawings in the following description are some embodiments of the present invention, and those skilled in the art may further obtain other accompanying drawings according to these accompanying drawings without making creative efforts.

DETAILED DESCRIPTION OF THE EMBODIMENTS

Figure 1:
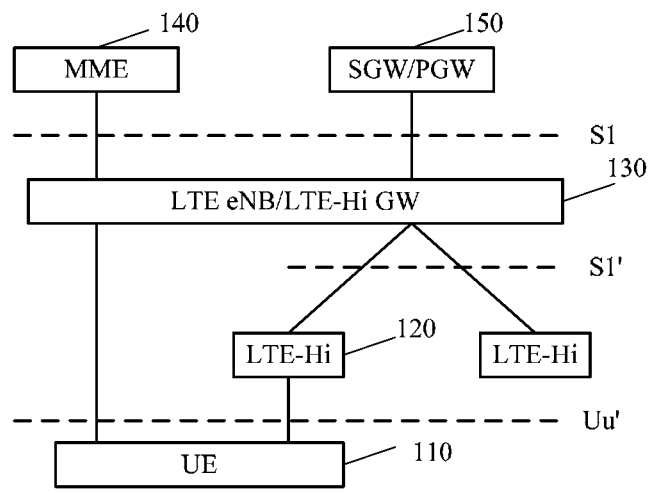
FIG. 1 is a structural schematic diagram of a communication system according to an embodiment of the present invention.

A clear and complete description of technical solutions in the embodiments of the present invention will be given below, in combination with the accompanying drawings in the embodiments of the present invention. Apparently, the embodiments described are merely a part, but not all, of the embodiments of the present invention. All of other embodiments, obtained by those skilled in the art based on the embodiments of the present invention without making any creative effort, fall into the protection scope of the present invention.

It should be understood that, the technical solutions of the present invention may be applied to various communication systems, for example: a global system of mobile communication (GSM, Global System of Mobile communication) system, a code division multiple access (CDMA, Code Division Multiple Access) system, a wideband code division multiple access (WCDMA, Wideband Code Division Multiple Access) system, a general packet radio service (GPRS, General Packet Radio Service), a long term evolution (LTE, Long Term Evolution) system, an advanced long term evolution (LTE-A, Advanced long term evolution) system, a universal mobile telecommunication system (UMTS, Universal Mobile Telecommunication System), etc, this is not limited in the embodiments of the present invention, but for convenience of description, the embodiments of the present invention will be illustrated by taking an LTE network as an example.

The embodiments of the present invention may be applied to radio networks with different systems. A radio access network may include different network elements in different systems. For example, in an LTE (Long Term Evolution, long term evolution) and an LTE (Advanced long term evolution, advanced long term evolution), a network element of the radio access network includes an eNB (eNodeB, eNodeB), and in a WCDMA (Wideband Code Division Multiple Access, wideband code division multiple access), a network element of the radio access network includes an RNC (Radio Network Controller, radio network controller) and an NodeB. Similarly, other radio networks such as a WiMax (Worldwide Interoperability for Microwave Access, worldwide interoperability for microwave access) or the like may also adopt solutions similar to those of the embodiments of the present invention, except that related modules in base station systems may be different, this is not limited in the embodiments of the present invention, but for convenience of description, an eNodeB will be taken as an example for illustration in the following embodiments.

It should also be understood that, in the embodiments of the present invention, a terminal may also be called a user equipment (UE, User Equipment), a mobile station (MS, Mobile Station), a mobile terminal (Mobile Terminal), etc, and the terminal may communicate with one or multiple core networks through a radio access network (RAN, Radio Access Network), for example, the terminal may be a mobile telephone (or called a "cellular" telephone), a computer having a communication function and the like; for example, the terminal may also be a portable, pocket, hand-held, computer inbuilt or vehicle-mounted mobile device.

FIG. 1 is a structural schematic diagram of a communication system 100 according to an embodiment of the present invention. The communication system 100 includes: a user equipment 110, an LTE-Hi 120, an eNB 130, an MME (Mobility Management Entity, mobility management entity) 140 and an SGW/PGW (serving gateway/packet data network gateway, Serving Gateway/Packet Data Network Gateway) 150. The eNB 130 is connected to at least one LTE-Hi 120 through an S1' interface. The eNB 130 performs radio communication with the UE 110 through an air interface Uu. The LTE-Hi 120 performs radio communication with the UE 110 through an air interface Uu'. The eNB 130 is connected to the MME 140 and the SGW/PGW 150 through an S1 interface.

In the embodiment of FIG. 1, the S1' interface and the Uu' interface have enhanced functions compared with the standard S1 interface and the Uu interface respectively: for example, a management function of local bearers (including an S1' bearer from the eNB 130 to the LTE-Hi 120 and a radio bearer (RB, Radio Bearer) from the LTE-Hi 120 to the UE 110) between the eNB 130 and the UE 110 established through the LTE-Hi 120, for example, establishment, modification and deletion of the bearers. The difference from the management a common bearer between a UE and an eNB lies in that, the management of a bearer in the embodiment of the present invention may be initiated by the eNB, and a common bearer is initiated by a core network.

Figure 2:
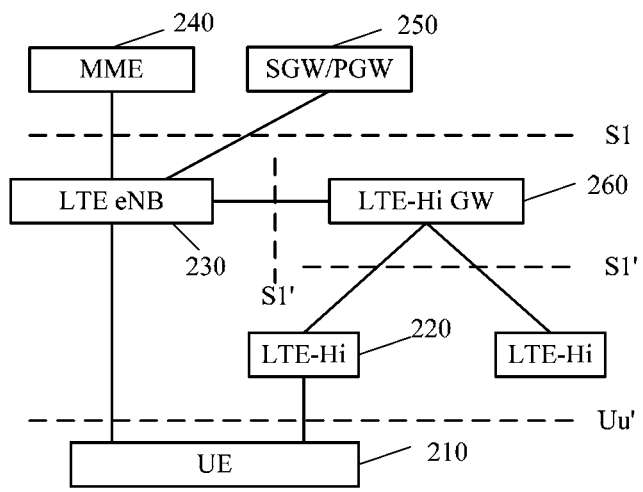
FIG. 2 is a structural schematic diagram of a communication system according to an embodiment of the present invention.

FIG. 2 is a structural schematic diagram of a communication system 200 according to an embodiment of the present invention. The communication system 200 includes: a user equipment 210, an LTE-Hi 220, an eNB 230, an MME 240, an SGW/PGW 250 and an LTE GW 260. The eNB 230 is connected to the LTE GW 260 through an S1' interface, and the LTE GW 260 is connected to at least one LTE-Hi 220 through an S1' interface. The eNB 230 performs radio communication with the UE 210 through an air interface Uu. The LTE-Hi 220 performs radio communication with the UE 210 through an air interface Uu'. The eNB 230 is connected to the MME 240 and the SGW/PGW 250 through an S1 interface.

In the embodiment of FIG. 2, the S1' interface and the Uu' interface have enhanced functions compared with the standard S1 interface and the Uu interface respectively: for example, a management function of local bearers (including an S1' bearer from the eNB 230 to the LTE-Hi GW 260, an S1' bearer from the LTE-Hi GW 260 to the LTE-Hi 220 and an RB from the LTE-Hi 220 to the UE 210) between the eNB 230 and the UE 210 established through the LTE-Hi 220, for example, establishment, modification and deletion of the bearers. The difference from the management of a bearer between a common UE and an eNB lies in that, the management of a bearer in the embodiment of the present invention may be initiated by the eNB, but a common bearer is initiated by a core network.

In an architecture of the communication system according to the embodiment of the present invention, the eNB may be integrated with the LTE-Hi GW or may also be separated from the LTE-Hi GW. It should be noted that, in the event that the eNB is separated from the LTE-Hi GW, the eNB is connected to the LTE-Hi GW through the S1'. And the LTE-Hi GW is used as S1' proxy (Proxy) to forward an S1 message between the eNB and the LTE-Hi. In this case, the local bearers from the eNB to the UE through the LTE-Hi GW and the LTE-Hi will include three segments: an S1 bearer between the eNB and the LTE-Hi GW, an S1 bearer between the LTE-Hi GW and the LTE-Hi, and a Uu bearer between the LTE-Hi and the UE.

Hereinafter, the embodiments according to the present invention are mainly described by taking an eNB and LTE-Hi GW integrated solution as an example, but all methods are also applicable to an eNB and LTE-Hi GW separated solution.

In the architecture of the communication system according to the embodiment of the present invention, the eNB is connected to an MME and the SGW/PGW in a core network through the standard S1 interface. The LTE-Hi is not directly accessed to the core network, but is accessed to the eNB/LTE-Hi GW through an enhanced S1 interface (S1'). For the core network, the LTE-Hi is rendeded as a cell of the eNB, rather than one eNB. The S1' interface between the eNB and the LTE-Hi is enhanced with a function of dynamic service offloading between the eNB and the LTE-Hi on the basis of a standard S1 interface. Therefore, besides supporting the UE to access a network through the LTE-Hi, the S1' may also support dynamic service offloading between the eNB and the LTE-Hi under the control of the eNB. Similarly, the Uu' interface between the UE and the LTE-Hi is also enhanced with a function of dynamic service offloading between the eNB and the LTE-Hi on the basis of a standard Uu interface. The LTE-Hi according to the embodiment of the present invention may be independently deployed, and supports the UE to access the network through the LTE-Hi. In addition, the embodiment according to the present invention may be applied to an area without overlapped coverage of the LTE-Hi and the eNB, and may support application of the LTE-Hi to a scenario of coverage extension.

Figure 3:
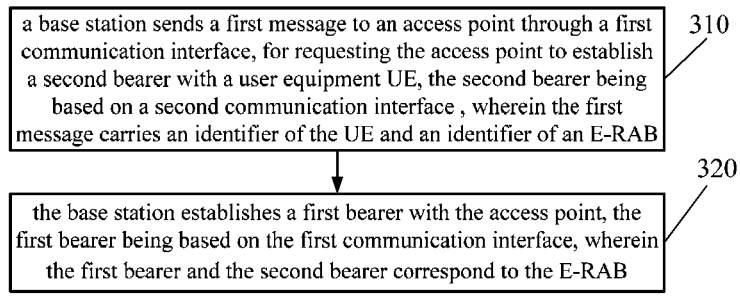
FIG. 3 is a schematic flowchart of an access method according to an embodiment of the present invention.

FIG. 3 is a schematic flowchart of an access method according to an embodiment of the present invention. The method of FIG. 3 may be executed by the eNB 130 of FIG. 1 or the eNB 230 of FIG. 2.

310, a base station sends a first message to an access point through a first communication interface, for requesting the access point to establish a second bearer with a user equipment UE, the second bearer being based on a second communication interface, wherein the first message carries an identifier of the UE and an identifier of an E-RAB.

For example, the above-mentioned access point may be an LTE-Hi, the embodiments according to the present invention are not limited hereto, and the above-mentioned access point may also be other access devices similar to the LTE-Hi, for example, a micro-base station.

For example, the first communication interface is an S1 interface (called an S1' interface for short hereinafter) communication interface with an enhanced function, and the second communication interface is a Uu interface called a Uu' interface for short hereinafter) communication interface with an enhanced function. For example, the first bearer may be an S1 bearer, and the second bearer may a Uu' bearer.

For example, the first message may be an E-RAB setup request message. The E-RAB setup request may carry an identifier allocated by the UE in an cell covered by the LTE-Hi, for example, a C-RNTI allocated by the LTE-Hi. In addition, the first message may also carry related configuration information necessary for establishing a bearer, for example, a TEID (Tunnel endpoint identifier, a tunnel endpoint identifier), an SGW IP (Serving Gateway IP, serving gateway IP), QoS (Quality of Service, quality of service), etc. The embodiments according to the present invention are not limited hereto, for example, the first message may also be a dedicated signaling message. The E-RAB setup request message may be similar to an existing E-RAB setup request message, but does not need to carry an NAS PDU.

320, the base station establishes a first bearer with the access point, the first bearer being based on the first communication interface, wherein the first bearer and the second bearer correspond to the E-RAB.

In the technical solution, the first bearer which is based on the first communication interface is established between the access point and the base station, and the second bearer which is based on the second communication interface is established between the access point and the UE, in order to transmit data through the first bearer and the second bearer under the control of the base station, thereby realizing load balance between the base station and the access point.

In 310, the base station sends the first message to the access point through the first communication interface via an access point gateway, and the base station, with the access point, establishes a bearer which is between the base station and the access point gateway and is based on the first communication interface, and a bearer which is between the access point gateway and the access point and is based on the first communication interface.

For example, the access point gateway may be an LTE-Hi GW (Gateway, gateway). One LTE-Hi GW may be connected to a plurality of LTE-Hi through a plurality of S1 interfaces respectively, and is connected to the base station through one S1 interface to aggregate the plurality of LTE-Hi, thereby greatly decreasing the number of the S1 interfaces connected to the base station or the core network.

Optionally, as another embodiment, the base station transmits data through a third bearer which is between the base station and the UE, and is based on a third communication interface, and the method of FIG. 1 further includes: the base station sends a second message to the UE, for instructing the UE to delete the third bearer, wherein the second message carries an identifier of the third bearer; the base station switches from transmitting the data through the third bearer to transmitting the data through the first bearer and the second bearer.

For example, the second message may be an RRC connection reconfiguration message, and the embodiments according to the invention are not limited hereto, for example, the second message may also be a dedicated signaling message. The second message may be similar to a conventional RRC connection reconfiguration message, but does not need to carry an NAS-PDU.

For example, the third communication interface is a common Uu interface communication interface, and the third bearer is a Uu bearer. In order to switch from transmitting the data through the third bearer to transmitting the data through the first bearer and the second bearer, the first bearer and the second bearer may be established firstly, and then, the third bearer is deleted.

Optionally, as another embodiment, the method of FIG. 1 further includes: the base station selects the access point for the UE; the base station sends a third message to the UE through the third communication interface, for instructing the UE to establish a connection with the access point, wherein the third message contains an identifier of the access point.

For example, the UE may measure based on the measurement configuration of the base station and report a measurement result, which may include the information of a plurality of measured available access points, to the eNB. Then, the base station may select a proper access point from the plurality of measured access points according to a preset strategy.

For example, the third message may be an RRC connection reconfiguration message. The base station uses the RRC connection reconfiguration message to indicate an identifier of the LTE-Hi selected for the UE and used for service offloading, and the embodiments according to the invention are not limited hereto, for example, the third message may also be a dedicated signaling message.

For example, the UE may establish an RRC connection with the LTE-Hi selected thereby according to the indication of the eNB: the UE sends an RRC connection setup request message to the LTE-Hi, the LTE-Hi sends an RRC connection setup message (containing an identifier allocated to the UE by the LTE-Hi, e.g., a C-RNTI allocated by the LTE-Hi) to the UE, and the UE replies an RRC connection setup complete message to the LTE-Hi, but does not continue the procedure of an NAS. Unlike an ordinary message, the RRC connection setup complete message does not carry an NAS-PDU.

Further, the base station receives an RRC connection reconfiguration complete message from the UE, wherein the RRC connection reconfiguration complete message is used for responding to the third message and carries the C-RNTI allocated to the UE by the LTE-Hi.

Further, the base station receives an E-RAB setup response message from the LTE-Hi, for responding to the first message, and the E-RAB setup response message carries the ID of an RB corresponding to each E-RAB, wherein the ID of the RB is optional.

In 310, after receiving a fourth message from the core network, the base station sends the first message to the access point through the first communication interface, the fourth message is used for requesting the base station to establish the first bearer and the second bearer with the UE through the access point, and the fourth message carries an identifier of an E-RAB corresponding to the first bearer and the second bearer.

For example, the fourth message may be a bearer setup request/session management request message, and the embodiments according to the invention are not limited hereto, for example, the fourth message may also be a dedicated signaling message.

Optionally, as another embodiment, the method of FIG. 1 further includes: the base station sends a fifth message to the UE, for notifying the UE of transmitting data corresponding to the E-RAB by using the second bearer, wherein the fifth message carries an identifier of the second bearer and an identifier of the E-RAB.

Optionally, as another embodiment, the method of FIG. 1 further includes: the base station may establish a fourth bearer with the UE, notify the UE and the access point of deleting the first bearer and the second bearer, and transmit data corresponding to the above-mentioned E-RAB through the fourth bearer.

For example, the fifth message is an RRC connection reconfiguration message, the embodiments according to the invention are not limited hereto, for example, the fifth message may also be a dedicated signaling message.

Further, the base station may receive the RRC connection reconfiguration complete message from the UE, for responding to the fifth message.

Further, after receiving the RRC connection reconfiguration complete message used for responding to the fifth message, the base station sends a bearer setup response to the core network, for responding to the fourth message.

Optionally, as another embodiment, the method of FIG. 1 further includes: the base station transmits a signaling message, related to access of the UE to the core network, between the base station and the access point through the first communication interface; the base station transmits a signaling message, related to access of the UE to the core network, between the base station and the core network through a fourth communication interface.

For example, in a place which is only covered by an LTE-Hi but not covered by an base station, the UE may access the core network through the Uu' interface between the UE and the LTE-Hi, the S1' interface between the LTE-Hi and the eNB and the S1 interface between the eNB and the core network, and thus the LTE-Hi may be deployed in an area which are not covered by an macro network for coverage extension. The fourth communication interface is an S1 interface communication interface between the base station and the core network.

Figure 4:
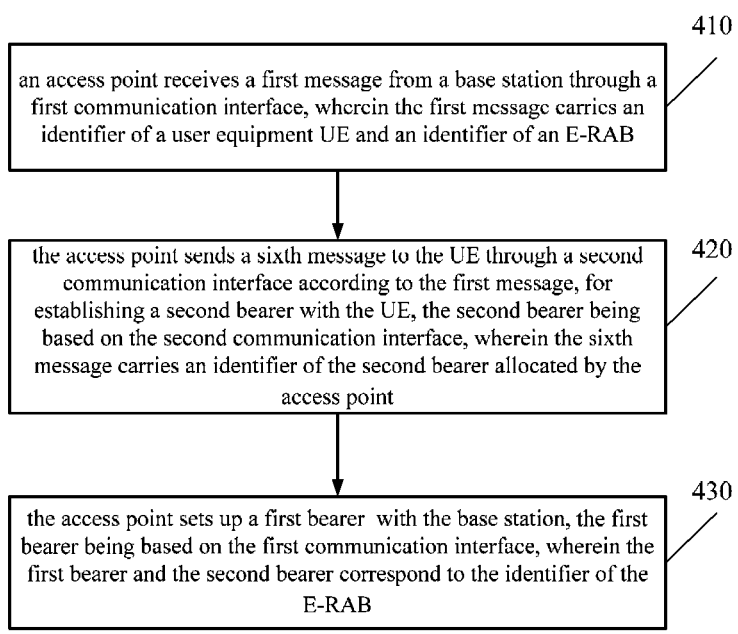
FIG. 4 is a schematic flowchart of an access method according to another embodiment of the present invention.

FIG. 4 is a schematic flowchart of an access method according to another embodiment of the present invention. The method of FIG. 4 may be executed by the LTE-Hi 120 of FIG. 1 or the LTE-Hi 220 of FIG. 2. The method of FIG. 4 corresponds to the method of FIG. 3, so a detailed description is omitted appropriately herein.

410, an access point receives a first message from a base station through a first communication interface, wherein the first message carries an identifier of a user equipment UE and an identifier of an E-RAB.

420, the access point sends a sixth message to the UE through a second communication interface according to the first message, for establishing a second bearer with the UE, the second bearer being based on the second communication interface, wherein the sixth message carries an identifier of the second bearer allocated by the access point.

For example, the sixth message may be an RRC connection reconfiguration message, and the RRC connection reconfiguration message may carry an identifier of a bearer corresponding to the E-RAB and allocated by a high frequency access device.

430, the access point establishes a first bearer with the base station, the first bearer being based on the first communication interface, wherein the first bearer and the second bearer correspond to the identifier of the E-RAB.

In the technical solution, the first bearer which is based on the first communication interface is established between the access point and the base station, and the second bearer which is based on the second communication interface is established between the access point and the UE, in order to transmit data through the first bearer and the second bearer under the control of the base station, thereby realizing load balance between the base station and the access point.

In 410, the access point receives the first message from the base station through the first communication interface via an access point gateway, and the access point, with the base station, establishes a bearer which is between the base station and the access point gateway and is based on the first communication interface, and a bearer which is between the access point gateway and the access point and is based on the first communication interface.

Optionally, as another embodiment, the access point is an access point selected by the base station for the UE, and the method of FIG. 4 further includes: the access point establishes a connection with the UE through the second communication interface.

Optionally, as another embodiment, the method of FIG. 4 further includes: the access point transmits a signaling message, related to access of the UE to the core network, between the base station and the access point through the first communication interface and between the access point and the UE through the second communication interface.

Figure 5:
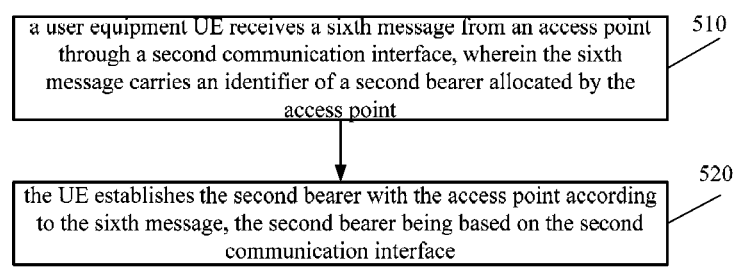
FIG. 5 is a schematic flowchart of an access method according to another embodiment of the present invention.

FIG. 5 is a schematic flowchart of an access method according to another embodiment of the present invention. The method of FIG. 5 may be executed by the UE 110 of FIG. 1 or the UE 210 of FIG. 2. The method of FIG. 5 corresponds to the methods of FIG. 3 and FIG. 4, so a detailed description is omitted appropriately herein.

510, a user equipment UE receives a sixth message from an access point through a second communication interface, wherein the sixth message carries an identifier of a second bearer allocated by the access point.

520, the UE establishes the second bearer with the access point according to the sixth message, the second bearer being based on the second communication interface.

In the technical solution, the first bearer which is based on the first communication interface is established between the access point and the base station, and the second bearer which is based on the second communication interface is established between the access point and the UE, in order to transmit data through the first bearer and the second bearer under the control of the base station, thereby realizing load balance between the base station and the access point.

Optionally, as another embodiment, the UE transmits data through a third bearer which is between the UE and the base station and is based on a third communication interface, and the method of FIG. 5 further includes: the UE receives a second message from the base station, wherein the second message carries an identifier of the third bearer; the UE deletes the third bearer according to the second message; and the UE transmits the data through the second bearer.

Optionally, as another embodiment, the method of FIG. 5 further includes: the UE receives a third message from the base station, wherein the third message contains an identifier of the access point; and the UE establishes a connection with the access point according to the third message.

Optionally, as another embodiment, the method of FIG. 5 further includes: the UE receives a fifth message from the base station, wherein the fifth message carries an identifier of the second bearer; and the UE transmits data corresponding to an E-RAB bearer according to the fifth message by using the second bearer.

Optionally, as another embodiment, the method of FIG. 5 further includes: the UE transmits a signaling message, related to access of the UE to the core network, between the UE and the access point through the second communication interface.

Optionally, as another embodiment, the method of FIG. 5 further includes: the second communication interface is an air interface with an enhanced function.

The embodiment of the present invention will be illustrated below in combination with specific examples.

Figure 6:
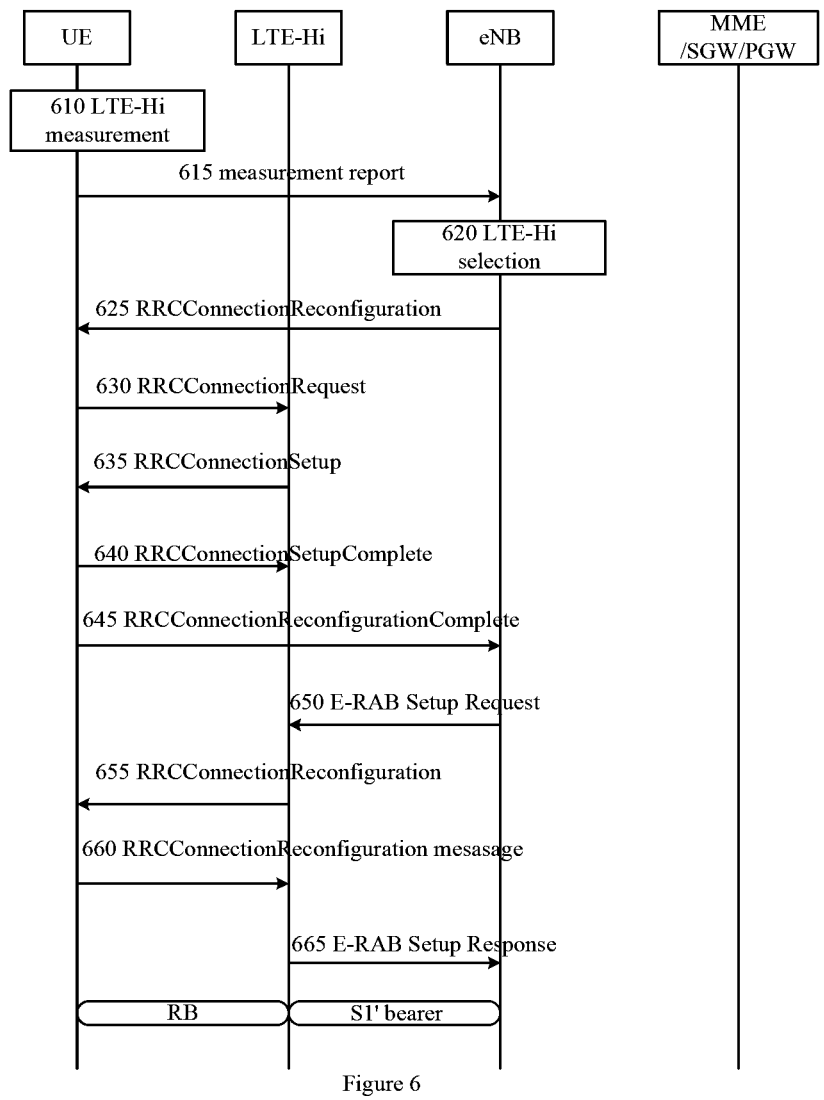
FIG. 6 is a schematic flowchart of an access process according to an embodiment of the present invention.

FIG. 6 is a schematic flowchart of an access process according to an embodiment of the present invention. The embodiment of FIG. 6 describes management of local bearers, which is established by an LTE-Hi, between an eNB and UE.

610, the UE measures the LTE-Hi to obtain a measurement result of at least one LTE-Hi.

For example, the UE may measure a neighboring LTE-Hi according to the measurement configuration of the eNB, and is possible to measure at least one available LTE-Hi cell.

615, the UE reports the measured at least one available LTE-Hi to the eNB through a measurement report.

For example, the UE reports the detected available LTE-Hi cell to the eNB in a measurement report, and measurement parameters carried in the measurement report include measurement-related parameters such as a cell identifier, air interface link quality, etc. For example, the cell identifier may be a CGI (Cell Global Identifier, cell global identifier).

620, the eNB selects one of the above-mentioned at least one available LTE-Hi according to a preset strategy.

For example, the eNB judges whether to execute service offloading for the UE according to the current service characteristic (e.g., a QoS parameter or the like) of the UE. For example, if the UE only has a VoIP service with a low throughput rate at present, the eNB may execute no service offloading for the UE. If the UE further has large-bandwidth internet (Internet) services at present, the eNB may offload a part of the internet services to the LTE-Hi, thereby saving the air interface resource of the eNB.

If the eNB judges that the UE should perform service offloading through the LTE-Hi, it will further select an LTE-Hi suitable for offloading for the UE according to more information, but not limited to the following information: load information of candidate LTE-Hi cells, wherein the load information may be obtained through an S1' interface between the eNB and the LTE-Hi; measurement parameters related to the air interface quality of each candidate LTE-Hi in the measurement report of the UE; and other information which may be used for judging offloading, etc.

625, the eNB sends an RRC (RadioResourceControl, radio resource control) connection reconfiguration (RRC-ConnectionReconfiguration) message to the UE, for instructing the UE to establish an RRC connection with the selected LTE-Hi.

For example, once the eNB selects a LTE-Hi cell suitable for offloading for the UE, the eNB sends the selected LTE-Hi to the UE by using the RRC connection reconfiguration message, for example, the RRC connection reconfiguration message carries an identifier (for example, CGI) of the selected LTE-Hi.

630, after receiving the above-mentioned RRC connection reconfiguration message, the UE sends an RRC connection request (RRCConnectionRequest) message to the selected LTE-Hi according to the instruction from the eNB.

635, after receiving the above-mentioned RRC connection request message, the LTE-Hi sends an RRC connection setup (RRCConnectionSetup) message to the UE.

For example, the LTE-Hi allocates an identifier of the UE within the LTE-Hi to the UE, for example, a C-RNTI (Cell Radio Network Temporary Identifier, cell radio network temporary identifier), and the C-RNTI is carried in the RRC connection setup message.

640, after receiving the above-mentioned RRC connection setup message, the UE sends an RRC connection setup complete (RRCConnectionSetupComplete) message to the LTE-Hi.

So far, the UE establishes the RRC connection with the selected LTE-Hi and does not continue the procedure of an NAS, namely, the RRC connection setup complete message does not carry an NAS-PDU (Non Access Stratum-Protocol Data Unit, non access stratum-protocol data unit).

645, the UE sends an RRC connection reconfiguration complete (RRCConnectionReconfigurationComplete) message to the eNB.

For example, when the RRC connection between the UE and the LTE-Hi is established successfully, the UE sends back the RRC connection reconfiguration complete message to the eNB, to acknowledge that the RRC connection between it and the LTE-Hi selected by the eNB has been established, and for carrying the C-RNTI allocated to the UE by the LTE-Hi.

650, after receiving the RRC connection reconfiguration complete message, the eNB sends an E-RAB setup request (E-RAB Setup Request) message to the LTE-Hi.

For example, the E-RAB setup request message carries an identifier corresponding to the E-RAB and allocated to the UE by the LTE-Hi, for example, the C-RNTI allocated by the LTE-Hi, and does not carry a NAS-PDU. For example, the E-RAB setup request message further carries an identifier of an E-RAB to be established. In addition, the E-RAB setup request message further carries related configuration information for establishing a bearer, such as a TEID (Tunnel endpoint identifier, tunnel endpoint identifier), an SGW IP (Serving Gateway IP, serving gateway IP), QoS (Quality of Service, quality of service), etc.

655, after receiving the E-RAB setup request message, the LTE-Hi sends the RRC connection reconfiguration message to the UE.

For example, after receiving the E-RAB setup request, the LTE-Hi allocates an identifier of an RB corresponding to the identifier of the E-RAB, and carries the identifier of the RB in the RRC connection reconfiguration message. And then, the LTE-Hi initiates a bearer reconfiguration procedure for the UE indicated by the C-RNTI carried in the E-RAB setup request message. The E-RAB setup request message is similar to an existing E-RAB setup request message, but does not carry an NAS PDU.

660, after receiving the RRC connection reconfiguration message, the UE sends the RRC connection reconfiguration complete message to the LTE-Hi.

665, after receiving the RRC connection reconfiguration complete message, the LTE-Hi sends an E-RAB setup response (E-RAB Setup Response) message to the eNB.

For example, the E-RAB setup response message may carry the identifier of an RB corresponding to each E-RAB in an E-RAB setup list (E-RAB Setup List). The identifier of the RB is optional.

So far, the eNB successfully establishes local bearers with the UE through the LTE-Hi, including an SE bearer from the eNB to the LTE-Hi and an RB bearer from the LTE-Hi to the UE.

It should be understood that, the eNB may modify or delete the local bearers, which is successfully established by the eNB and the UE through the LTE-Hi, by means of an RRC connection reconfiguration procedure.

For example, when modifying the local bearers, the eNB may send an E-RAB modification request (E-RAB modification request) message to the LTE-Hi, and the message carries the C-RNTI of the UE, an identifier of the E-RAB to be modified, a parameter of modified QoS, etc. After receiving the E-RAB modification request message, the LTE-Hi modifies the QoS parameter of an S1 bearer with the eNB and sends the RRC connection reconfiguration message to the UE, and the RRC connection reconfiguration message carries the identifier of the RB corresponding to the identifier of the E-RAB. The UE modifies the QoS parameter of the RB according to the RRC connection reconfiguration message.

For example, when deleting the local bearers, the eNB may send an E-RAB release request (E-RAB Release Request) message to the LTE-Hi, and the message carries the C-RNTI of the UE and an identifier of an E-RAB to be released. After receiving the E-RAB modification request message, the LTE-Hi sends the RRC connection reconfiguration message to the UE, and the RRC connection reconfiguration message carries the identifier of the RB corresponding to the identifier of the E-RAB. The UE deletes the RB according to the RRC connection reconfiguration message. Finally, the LTE-Hi deletes the S1 bearer with the eNB, and sends back an acknowledgement message to the eNB.

The embodiment according to the present invention adopts the S1' interface and the Uu' interface with enhanced functions, to realize a management function of the local bearers (including an S1' bearer from the eNB to the LTE-Hi and an RB from the LTE-Hi to the UE) between the eNB and the UE through the LTE-Hi, including establishment, deletion, modification and the like of the bearers.

Figure 7:
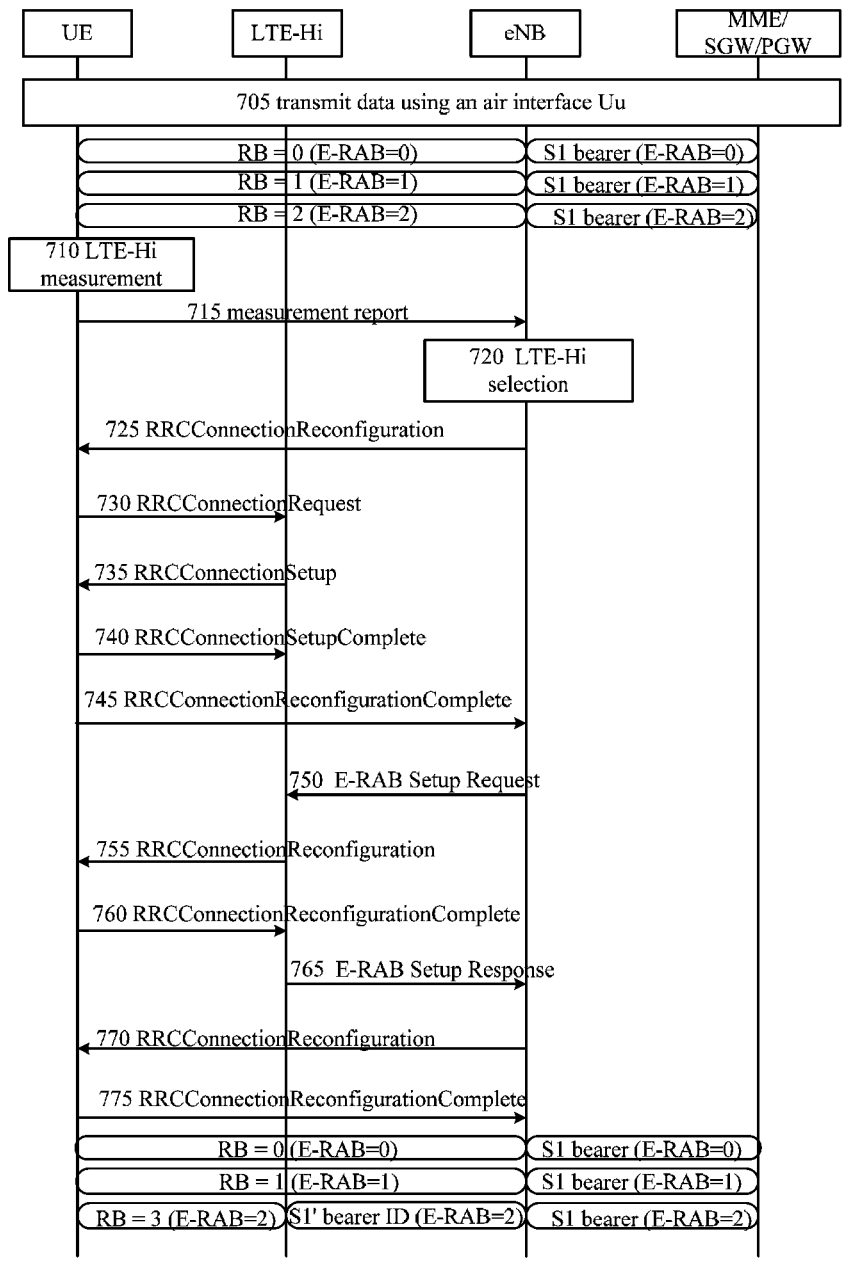
FIG. 7 is a schematic flowchart of an access process according to another embodiment of the present invention.

FIG. 7 is a schematic flowchart of an access process according to another embodiment of the present invention.

In the embodiment according to the present invention, it is assumed that, the UE has established three bearers (E-RAB=0, E-RAB=1 and E-RAB=2) with a network through an eNB, the identifiers (ID) of its Uu bearer (namely, RB) are 0, 1 and 2 respectively, and the IDs of S1 bearers are 0, 1 and 2 respectively. An illustration is given below by taking it as an example that the bearer (RB=2) with RB ID of 2 of the UE is offloaded to an LTE-Hi for transmission. The following 710 to 765 are similar to 610 to 665, so a detailed description is omitted appropriately herein.

705, the UE and the eNB transmit data using an air interface Uu.

For example, the UE establishes a connection with the network through the eNB and establishes three Uu bearers: RB=0, RB=1 and RB=2. The UE transmits the data through the three bearers.

710, the UE measures the LTE-Hi to obtain a measurement result of at least one LTE-Hi.

715, the UE reports the measured at least one available LTE-Hi to the eNB through a measurement report.

720, the eNB selects one of the above-mentioned at least one available LTE-Hi according to a preset strategy.

725, the eNB sends an RRC connection reconfiguration message to the UE, for instructing the UE to establish an RRC connection with the selected LTE-Hi.

730, after receiving the above-mentioned RRC connection reconfiguration message, the UE sends an RRC connection request message to the selected LTE-Hi according to the instruction from the eNB.

735, after receiving the above-mentioned RRC connection request message, the LTE-Hi sends an RRC connection setup message to the UE.

740, after receiving the above-mentioned RRC connection setup message, the UE sends an RRC connection setup complete message to the LTE-Hi.

745, the UE sends an RRC connection reconfiguration complete message to the eNB.

750, after receiving the RRC connection reconfiguration complete message, the eNB sends an E-RAB setup request (E-RAB Setup Request) message to the LTE-Hi.

For example, the eNB sends the E-RAB setup request (E-RAB Setup Request) message to the LTE-Hi, for establishing a local bearer (in the embodiment, the offloaded bearer is a bearer of E-RAB=2) for a offloading purpose through the LTE-Hi. The E-RAB setup request message carries an E-RAB list to be setup (E-RAB List to be Setup), which includes identifiers of offloaded E-RAB bearers. In addition, the E-RAB setup request message further carries an identifier allocated to the UE by the LTE-Hi, for example, a C-RNTI allocated by the LTE-Hi, and does not carry an NAS-PDU.

755, after receiving the E-RAB setup request message, the LTE-Hi sends the RRC connection reconfiguration message to the UE.

For example, after receiving the E-RAB setup request message, the LTE-Hi allocates an identifier (in the embodiment, RB=3) of an RB corresponding to the identifier of the E-RAB (in the embodiment, E-RAB=2), and carries the identifier of the RB in the RRC connection reconfiguration message. And then, the LTE-Hi initiates a bearer reconfiguration procedure for the UE indicated by the C-RNTI carried in the E-RAB setup request message according to the E-RAB setup request message.

760, after receiving the RRC connection reconfiguration message, the UE sends the RRC connection reconfiguration complete message to the LTE-Hi.

765, after receiving the RRC connection reconfiguration complete message, the LTE-Hi sends an E-RAB setup response (E-RAB Setup Response) message to the eNB.

For example, the E-RAB setup response message may carry the identifier of the RB corresponding to the E-RAB in an E-RAB setup list (E-RAB Setup List), for example, in the embodiment, the bearer corresponding to the bearer of E-RAB=2 is a bearer of RB=3.

770, after receiving the E-RAB setup response message, the eNB sends the RRC connection reconfiguration message to the UE to delete the original RB, for example, delete the bearer of RB=2. The RRC connection reconfiguration message is similar to a conventional RRC connection reconfiguration message, but may carry no NAS-PDU.

For example, the RRC connection reconfiguration message carries an identifier (for example, RB=2) of an RB to be deleted.

775, after receiving an RRC connection reconfiguration complete (RRCConnectionReconfigurationComplete) message from the UE, the eNB switches from the original bearer (RB=2) to the bearer (RB=3) which passes the LTE-Hi.

So far, the bearer of E-RAB=2 is successfully switched from the eNB to the bearer which passes the LTE-Hi.

It should be understood that, the above-mentioned embodiment merely describes offloading of a service from the eNB to the LTE-Hi for transmission. It may be conceived that, the service may also be offloaded from the LTE-Hi to the eNB for transmission, and correspondingly, a related procedure need to be changed, for example, the eNB may firstly establish a new bearer with the UE, and then notifies the UE and the LTE-Hi to delete the bearer between the eNB and the LTE-Hi and the bearer between the LTE-Hi and the eNB.

In the embodiment according to the present invention, after finding an available LTE-Hi, the UE, connected to a network through the eNB, dynamically offloads a part or all of traffic to the LTE-Hi for transmission under the control of the eNB. In other words, the embodiment according to the present invention may perform dynamic service offloading which is based on a bearer level between the eNB and the LTE-Hi, for example, in an overlapped coverage region of the LTE-Hi and the eNB, it may support the UE to access the network by using LTE and the LTE-Hi simultaneously for different bearers and realize the dynamic service offloading between the eNB and the LTE-Hi. The eNB air interface resource saved by offloading the traffic of the air interface of the eNB may be used for other UEs which are not covered by the LTE-Hi, thus increasing the throughput rates of these UE and improving user experience.

Figure 8:
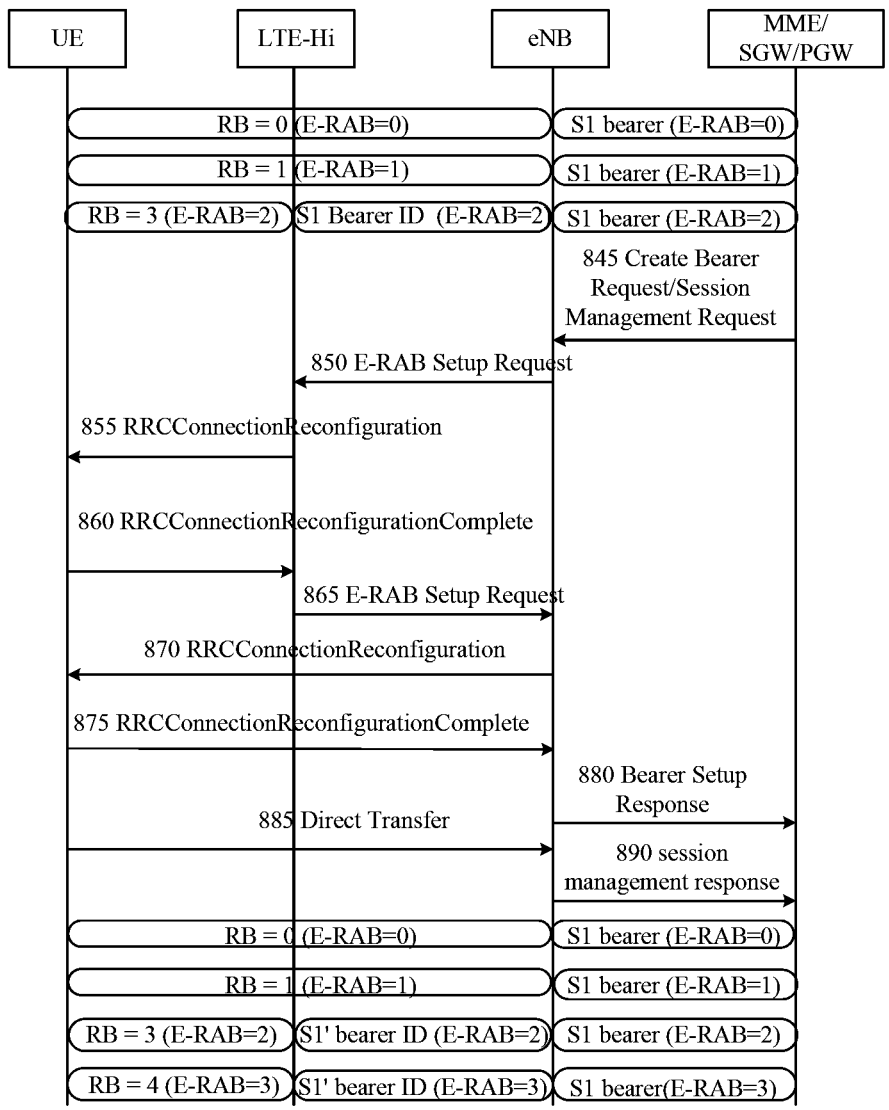
FIG. 8 is a schematic flowchart of an access process according to another embodiment of the present invention.

FIG. 8 is a schematic flowchart of an access process according to another embodiment of the present invention.

Based on the results of the embodiment of FIG. 7, UE may simultaneously communicate through an eNB and an LTE-Hi, for example, the UE transmits data through bearers (for example, RB=0 and RB=1) with the eNB and transmits data through a bearer (for example, RB=3) with the LTE-Hi and a bearer (S1 bearer) between the LTE-Hi and the eNB. The embodiment of FIG. 8 illustrates how to establish a new bearer through the LTE-Hi under this condition. The following 850 to 865 are similar to 650 to 665, so a detailed description is omitted appropriately herein.

845, the eNB receives a create bearer request/session management request (Create Bearer Request/Session Management Request) message from an MME. The create bearer request/session management request message is used for requesting the eNB to establish a bearer with the UE through the LTE-Hi, and contains an identifier of an E-RAB to be established.

850, after receiving the create bearer request/session management request message, the eNB sends an E-RAB setup request (E-RAB Setup Request) message to the LTE-Hi, for establishing an RB bearer with the UE through the LTE-Hi.

For example, the E-RAB setup request message carries an identifier (for example, in the embodiment, newly built E-RAB=3) of an E-RAB bearer to be established. In addition, the E-RAB setup request message further carries an identifier (for example, C-RNTI) of the UE, and the E-RAB setup request message is similar to an existing E-RAB setup request message, but does not carry an NAS PDU.

For example, the eNB may determine whether to establish the bearer with the UE through the LTE-Hi according to a preset strategy. The eNB may determine whether to establish the bearer with the UE through the LTE-Hi according to its own load, the load of the LTE-Hi which establishes a connection with the UE, QoS and the like.

855, after receiving the E-RAB setup request message, the LTE-Hi sends an RRC connection reconfiguration message to the UE.

For example, the RRC connection reconfiguration message carries an identifier (for example, RB=4) of an RB bearer corresponding to E-RAB=3, and the identifier of the RB bearer is allocated by the LTE-Hi.

860, after receiving the RRC connection reconfiguration message, the UE sends an RRC connection reconfiguration complete message to the LTE-Hi.

865, after receiving the RRC connection reconfiguration complete message, the LTE-Hi sends an E-RAB setup response message to the eNB.

For example, after the RB bearer setup is finished, the LTE-Hi sends the E-RAB setup response message to the eNB, for indicating that the bearer of RB=4 has been established. The E-RAB setup response message includes an E-RAB setup list, which contains an identifier (for example, RB=4) of the RB bearer which has been established.

870, after receiving the E-RAB setup response message, the eNB sends the RRC connection reconfiguration message to the UE, but does not establish a new bearer between the UE and the eNB directly, while by using the bearer of RB=4 established through the LTE-Hi.

For example, the RRC connection reconfiguration message is similar to an existing RRC connection reconfiguration message and carries an NAS-PDU, and the NAS-PDU contains an identifier of an E-RAB, to notify the UE of sending the data of the E-RAB on the bearer of RB=4.

875, after receiving the RRC connection reconfiguration message, the UE sends the RRC connection reconfiguration complete message to the eNB.

880, after receiving the RRC connection reconfiguration complete message, the eNB sends a bearer setup response (Bearer Setup Response) message to the MME.

885, the UE sends back a session management request (Session Management Request) message to the eNB by using a direct transfer (Direct Transfer) message.

890, after receiving the session management request message, the eNB forwards the same to the MME.

So far, a new bearer is successfully established through the LTE-Hi, and it contains an SE bearer (E-RAB=3) from the eNB to the LTE-Hi and an RB bearer (RB=4) from the LTE-Hi to the UE.

The access methods according to the embodiments of the present invention is described above, and the base station, the access point and the user equipment according to the embodiments of the present invention are described below respectively, in combination with FIG. 9 to FIG. 11.

Figure 9:
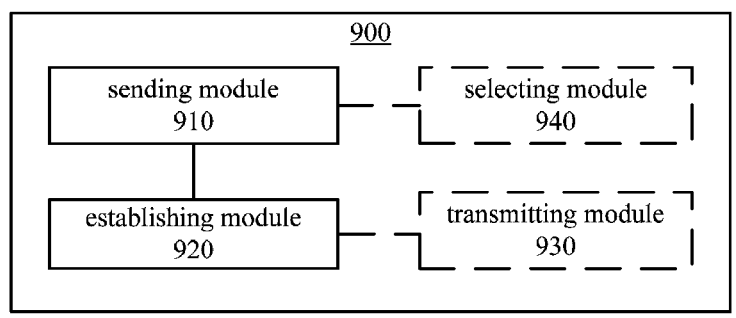
FIG. 9 is a structural schematic diagram of a base station according to an embodiment of the present invention.

FIG. 9 is a structural schematic diagram of a base station 900 according to an embodiment of the present invention. The base station 900 includes: a sending module 910 and a establishing module 920.

The sending module 910 is configured to send a first message to an access point through a first communication interface, for requesting the access point to establish a second bearer with a user equipment UE, the second bearer being based on a second communication interface, wherein the first message carries an identifier of the UE and an identifier of an E-RAB. The establishing module 920 is configured to establish a first bearer with the access point, the first bearer being based on the first communication interface, wherein the first bearer and the second bearer correspond to the E-RAB.

In the technical solution, the first bearer which is based on the first communication interface is established between the access point and the base station, and the second bearer which is based on the second communication interface is established between the access point and the UE, in order to transmit data through the first bearer and the second bearer under the control of the base station, thereby realizing load balance between the base station and the access point.

According to the embodiment of the present invention, the sending module 910 sends the first message to the access point through the first communication interface via an access point gateway, and the establishing module 920, with the access point, establishes a bearer, which is between the base station and the access point gateway and is based on the first communication interface, and a bearer, which is between the access point gateway and the access point and is based on the first communication interface.

Optionally, as another embodiment, the base station further includes: a transmitting module 930, configured to transmit data through a third bearer which is between the base station and the UE and is based on a third communication interface, the sending module 910 further sends a second message to the UE, for instructing the UE to delete the third bearer, wherein the second message carries an identifier of the third bearer, and the transmitting module 930 further switches transmitting the data through the third bearer to transmitting the data through the first bearer and the second bearer.

Optionally, as another embodiment, the base station 900 further includes: a selecting module 940, configured to select the access point for the UE, wherein the sending module 910 further sends a third message to the UE through the third communication interface, for instructing the UE to establish a connection with the access point, and the third message contains an identifier of the access point.

According to the embodiment of the present invention, after receiving, at the base station, a fourth message from the core network, the sending module 910 sends the first message to the access point through the first communication interface, the fourth message is used for requesting the base station to establish the first bearer and the second bearer with the UE through the access point, and the fourth message carries an identifier of an E-RAB corresponding to the first bearer and the second bearer.

Optionally, as another embodiment, the sending module 910 further sends a fifth message to the UE, for notifying the UE of transmitting data corresponding to the E-RAB by using the second bearer, wherein the fifth message carries an identifier of the second bearer.

The operations and functions of the units of the base station 900 may refer to the 310 and 320 of the method of FIG. 3, which are not repeated redundantly herein in order to avoid repetition.

Figure 10:
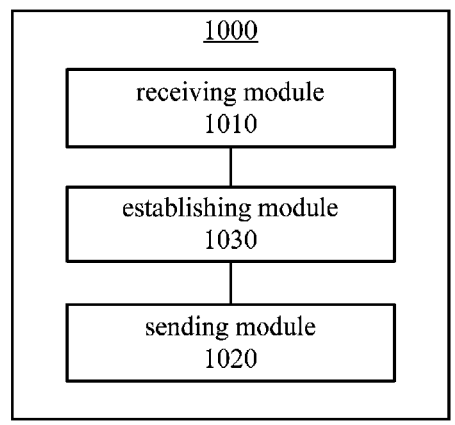
FIG. 10 is a structural schematic diagram of an access point according to an embodiment of the present invention.

FIG. 10 is a structural schematic diagram of an access point 1000 according to an embodiment of the present invention. The access point 1000 includes: a receiving module 1010, a sending module 1020 and a establishing module 1030.

The receiving module 1010 is configured to receive a first message from a base station through a first communication interface, wherein the first message carries an identifier of a user equipment UE and an identifier of an E-RAB. The sending module 1020 is configured to send a sixth message to the UE through a second communication interface according to the first message, for establishing a second bearer with, the UE is the second bearer being based on the second communication interface, wherein the sixth message carries an identifier of the second bearer allocated by the access point. The establishing module 1030 is configured to establish a first bearer which is based on the first communication interface with the base station, wherein the first bearer and the second bearer correspond to the identifier of the E-RAB.

In the technical solution, the first bearer which is based on the first communication interface is established between the access point and the base station, and the second bearer which is based on the second communication interface is established between the access point and the UE, in order to transmit data through the first bearer and the second bearer under the control of the base station, thereby realizing load balance between the base station and the access point.

According to the embodiment of the present invention, the receiving module 1010 receives the first message from the base station through the first communication interface via an access point gateway, and the establishing module 1030, with the base station, establishes a bearer which is between the base station and the access point gateway and is based on the first communication interface, and a bearer which is between the access point gateway and the access point and is based on the first communication interface.

Optionally, as another embodiment, the access point is an access point selected by the base station for the UE, and the establishing module 1030 further establishes a connection with the UE through the second communication interface.

The operations and functions of the units of the access point 1000 may refer to the 410, 420 and 430 of the method of FIG. 4, which are not repeated redundantly herein in order to avoid repetition.

Figure 11:
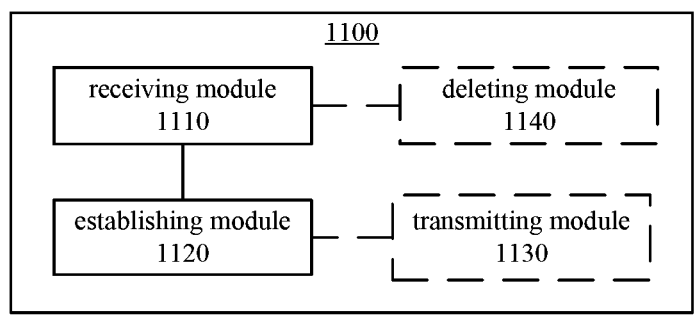
FIG. 11 is a structural schematic diagram of a user equipment according to an embodiment of the present invention.

FIG. 11 is a structural schematic diagram of user equipment 1100 according to an embodiment of the present invention. The user equipment 1100 includes: a receiving module 1110 and a establishing module 1120.

The receiving module 1110 is configured to receive a sixth message from an access point through a second communication interface, wherein the sixth message carries an identifier of a second bearer allocated by the access point. The establishing module 1120 is configured to establish a second bearer with the access point according to the sixth message, the second bearer being based on the second communication interface.

In the technical solution, the first bearer which is based on the first communication interface is established between the access point and the base station, and the second bearer which is based on the second communication interface is established between the access point and the UE, to transmit data through the first bearer and the second bearer under the control of the base station, thereby realizing load balance between the base station and the access point.

Optionally, as another embodiment, the user equipment 1100 further includes: a transmitting module 1130, configured to transmit data through a third bearer which is between the user equipment and the base station and is based on a third communication interface, wherein the receiving module 1110 further receives a second message from the base station, and the second message carries an identifier of the third bearer; the user equipment 1100 further includes: a deleting module 1140, configured to delete the third bearer according to the second message, wherein the transmitting module 1130 further transmits the data through the second bearer.

Optionally, as another embodiment, the receiving module 1110 further receives a third message from the base station, wherein the third message contains an identifier of the access point, and the establishing module 1120 further establishes a connection with the access point according to the third message.

Optionally, as another embodiment, the receiving module 1110 further receives a fifth message from the base station, wherein the fifth message carries an identifier of the second bearer, and the user equipment 1100 further includes: a transmitting module 1130, configured to transmit data corresponding to an E-RAB bearer by using the second bearer according to the fifth message.

The operations and functions of the units of the user equipment 1100 may refer to the 510 and 520 of the method of FIG. 5, which are not repeated redundantly herein in order to avoid repetition.

According to the embodiment of the present invention, the LTE-Hi may be connected to the eNB through the S1 and access the network by using a uniform S1 interface through the eNB, so that the LTE-Hi may be deployed in an area which is not covered by a macro network. Further, function enhancement is performed on the interface between the eNB and the LTE-Hi, specifically including: 1) in the event that the UE is connected to the eNB and the LTE-Hi simultaneously, certain bearers are supported to be established through the LTE-Hi; 2) certain bearers having been established on the eNB/LTE-Hi are dynamically switched to the LTE-Hi/eNB, to support service offloading and load balance between the eNB and the LTE-Hi, so that the air interface resource of the eNB may be saved as much as possible, to improve the throughout rate of the UE in an area which is not covered by an LTE-Hi, in other words, the air interface load of the eNB may be unloaded in the event that the LTE-Hi has idle capacity, to avoid reduction of the throughout rate of the UE served by the eNB, thus improving user experience. In addition, the S1 interface between the eNB and the LTE-Hi is enhanced without defining a new interface, thus reducing influence on the standard.

Those skilled in the art may realize that the units and steps of algorithm of the respective examples, described with reference to the embodiments disclosed in the text, can be accomplished by electronic hardware, or a combination of computer software and electronic hardware. Whether these functions are executed by means of hardware or software depends on a specific application and a design constraint condition of the technical solutions. Professional technical personnel may accomplish the described functions by adopting a different method for each specific application, but this kind of accomplishment should not go beyond the scope of the present invention.

Those skilled in the art may understand clearly that, for convenience and simplicity of description, specific working processes of the above-described systems, apparatus and units may be referred to corresponding processes in the aforementioned embodiments of the methods, and will not be described repeatedly herein.

In several embodiments provided by the present application, it should be understood that disclosed systems, apparatus and methods may be implemented by other manners For example, the embodiments of the apparatus described above are just illustrative. For example, division of the units is just a kind of division according to logical functions, and there may be other division manners for practical implementations. For example, multiple units or components may be combined or integrated into another system, or some features may be neglected or may not be performed. In addition, the shown or discussed mutual coupling or direct coupling or communication link may be an indirect coupling or communication link through some interfaces, apparatus or units, which may be in an electrical form, a mechanical form or in other forms.

The units described as separated parts may be, or may not be, physically separated, and the parts shown as units may be, or may not be, physical units, which may be located in one place or distributed to multiple network elements. Part or all units therein may be selected, according to an actual need, to implement the objective of solutions provided in the present invention.

In addition, the respective functional units in the respective embodiments of the present invention may be integrated into one processing unit, or the respective units may exist separately and physically, or, two or more units may be integrated into one unit.

If the function is implemented in the form of a software functional unit and is sold or used as an independent product, the function may be stored in a computer readable storage medium. Based on this understanding, the spirit, or the parts that make contributions to the prior art, of the technical solution in the present invention may be embodied in the form of a software product. The computer software product is stored in a storage medium, and includes a number of instructions that enable a computer device (may be a personal computer, a server, or a network device) to execute all or part of steps of the method described in the respective embodiments of the present invention. The preceding storage mediums includes various mediums that can store program codes, such as, a U disk, a removable hard disk, a read-only memory (Read-Only Memory, ROM), a random access memory (Random Access Memory, RAM), a magnetic disk, an optical disk, or the like.

The foregoing descriptions are merely specific embodiments of the invention, rather than limiting the protection scope of the invention. It is easy for any one skilled in the art to conceive changes or substitutions within the technical scope disclosed by the invention, and the changes or substitutions should fall in the protection scope of the invention. Therefore, the protection scope of the present invention should be defined by the claims.

What is claimed is:

1. A base station, comprising a processor and a non-transitory processor-readable medium having processor-executable instructions stored thereon, the processor-executable instructions including:
    a sending module, configured to send a first message to an access point through a first communication interface, for requesting the access point to establish a second bearer with a terminal device, the second bearer being based on a second communication interface, wherein the first message carries an identifier of the terminal device and an identifier of an Evolved Universal Terrestrial Radio Access Network Radio Access Bearer (E-RAB); and
    an establishing module, configured to establish a first bearer with the access point, the first bearer being based on the first communication interface, wherein the first bearer and the second bearer correspond to the identifier of the E-RAB.

2. The base station of claim 1, wherein the sending module sends the first message to the access point through the first communication interface via an access point gateway, and the establishing module, with the access point, establishes a first sub-bearer between the base station and the access point gateway based on the first communication interface, and a second sub-bearer between the access point gateway and the access point based on the first communication interface.

3. The base station of claim 1, further comprising: a transmitting module, wherein the transmitting module transmits data through a third bearer between the base station and the terminal device based on a third communication interface, the sending module further sends a second message to the terminal device, for instructing the terminal device to delete the third bearer, wherein the second message carries an identifier of the third bearer, and the transmitting module further switches from transmitting the data through the third bearer to transmitting the data through the first bearer and the second bearer.

4. The base station of claim 3, further comprising:
    a selecting module, configured to select the access point for the terminal device, wherein the sending module further sends a third message to the terminal device through the third communication interface, for instructing the terminal device to establish a connection with the access point, and the third message contains an identifier of the access point.

5. The base station of claim 1, wherein the sending module sends the first message to the access point through the first communication interface after receiving a fourth message from a core network, wherein the fourth message is used for requesting the base station to establish the first bearer and the second bearer with the terminal device through the access point, and the fourth message carries an identifier of the E-RAB corresponding to the first bearer and the second bearer.

6. The base station of claim 5, wherein the sending module further sends a fifth message to the terminal device, for notifying the terminal device of transmitting data corresponding to the E-RAB by using the second bearer, and the fifth message carries an identifier of the second bearer.

7. The base station of claim 5, wherein the sending module further sends a fifth message to the terminal device, for notifying the terminal device of transmitting data corresponding to the E-RAB by using the second bearer, and the fifth message carries an identifier of the second bearer and the identifier of the E-RAB.

8. The base station of claim 1, further comprising a notifying module and a transmitting module, wherein the establishing module is further configured to establish a fourth bearer with the terminal device, the notifying module is configured to notify the terminal device and the access point of deleting the first bearer and the second bearer, and the transmitting module is configured to transmit data corresponding to the E-RAB through the fourth bearer.

9. The base station of claim 1, further comprising: a transmitting module, configured to transmit a signaling message, related to access of the terminal device to a core network, between the base station and the access point through the first communication interface and transmit the signaling message, related to access of the terminal device to the core network, between the base station and the core network through a fourth communication interface.

10. An access point, comprising a processor and a non-transitory processor-readable medium having processor-executable instructions stored thereon, the processor-executable instructions including:
    a receiving module, configured to receive a first message from a base station through a first communication interface, wherein the first message carries an identifier of a terminal device and an identifier of an Evolved Universal Terrestrial Radio Access Network Radio Access Bearer (E-RAB);
    a sending module, configured to send a message to the terminal device through a second communication interface according to the first message, for establishing a second bearer with the terminal device, second bearer being based on the second communication interface, wherein the message carries an identifier of the second bearer allocated by the access point; and an establishing module, configured to establish a first bearer with the base station, the first bearer being based on the first communication interface, wherein the first bearer and the second bearer correspond to the identifier of the E-RAB.

11. The access point of claim 10, wherein the receiving module receives the first message from the base station through the first communication interface via an access point gateway, and the establishing module, with the base station, establishes a first sub-bearer between the base station and the access point gateway based on the first communication interface, and a second sub-bearer between the access point gateway and the access point based on the first communication interface.

12. The access point of claim 10, wherein the access point is an access point selected by the base station for the terminal device, and the establishing module further establishes a connection with the terminal device through the second communication interface.

13. The access point of claim 10, further comprising: a transmitting module, configured to transmit a signaling message, related to access of the terminal device to a core network, between the base station and the access point through the first communication interface and between the access point and the terminal device through the second communication interface.

14. A terminal device, comprising a processor and a non-transitory processor-readable medium having processor-executable instructions stored thereon, the processor-executable instructions including:

a receiving module, configured to receive a message from an access point through a second communication interface, wherein the message carries an identifier of a second bearer allocated by the access point;

an establishing module, configured to establish a second bearer with the access point according to the message, the second bearer being based on the second communication interface; and a transmitting module, configured to transmit a signaling message, related to access of the terminal device to a core network, between the terminal device and the access point through the second communication interface.

15. The terminal device of claim 14,
wherein the transmitting module is configured to transmit data through a third bearer between the terminal device and a base station based on a third communication interface, wherein the receiving module further receives a second message from the base station, the second message carries an identifier of the third bearer, and the terminal device further comprises:

a deleting module, configured to delete the third bearer according to the second message, wherein the transmitting module further transmits the data through the second bearer.

16. The terminal device of claim 15, wherein the receiving module further receives a third message from the base station, the third message contains an identifier of the access point, and the establishing module further establishes a connection with the access point according to the third message.

17. The terminal device of claim 14, wherein the receiving module further receives a fifth message from a base station, the fifth message carries an identifier of the second bearer, and
the transmitting module is configured to transmit data corresponding to an Evolved Universal Terrestrial Radio Access Network Radio Access Bearer (E-RAB) bearer using the second bearer according to the fifth message.

* * * * *